United States Patent Office 3,527,241
Patented Sept. 8, 1970

3,527,241
FLUID PRESSURE CONTROL SYSTEMS
Hubert R. Bristow, Maidstone, Kent, and John F. A. Parkes, St. Albans, England, assignors to Elliott Brothers (London) Limited, London, England
Continuation-in-part of application Ser. No. 365,652, May 7, 1964. This application Nov. 29, 1967, Ser. No. 686,607
Int. Cl. G01l 9/00; G05d 11/00
U.S. Cl. 137—98
11 Claims

ABSTRACT OF THE DISCLOSURE

A fluid pressure control system comprising pressure selecting means, a follow-up servo having a velodyne feedback path coupled to take its input from the pressure selecting means and apply its output to a differential unit which detects an error between the servo output and the actual pressure and applies a corresponding error signal to a closed loop servo system arranged to correct the actual pressure.

---

Figure 1:
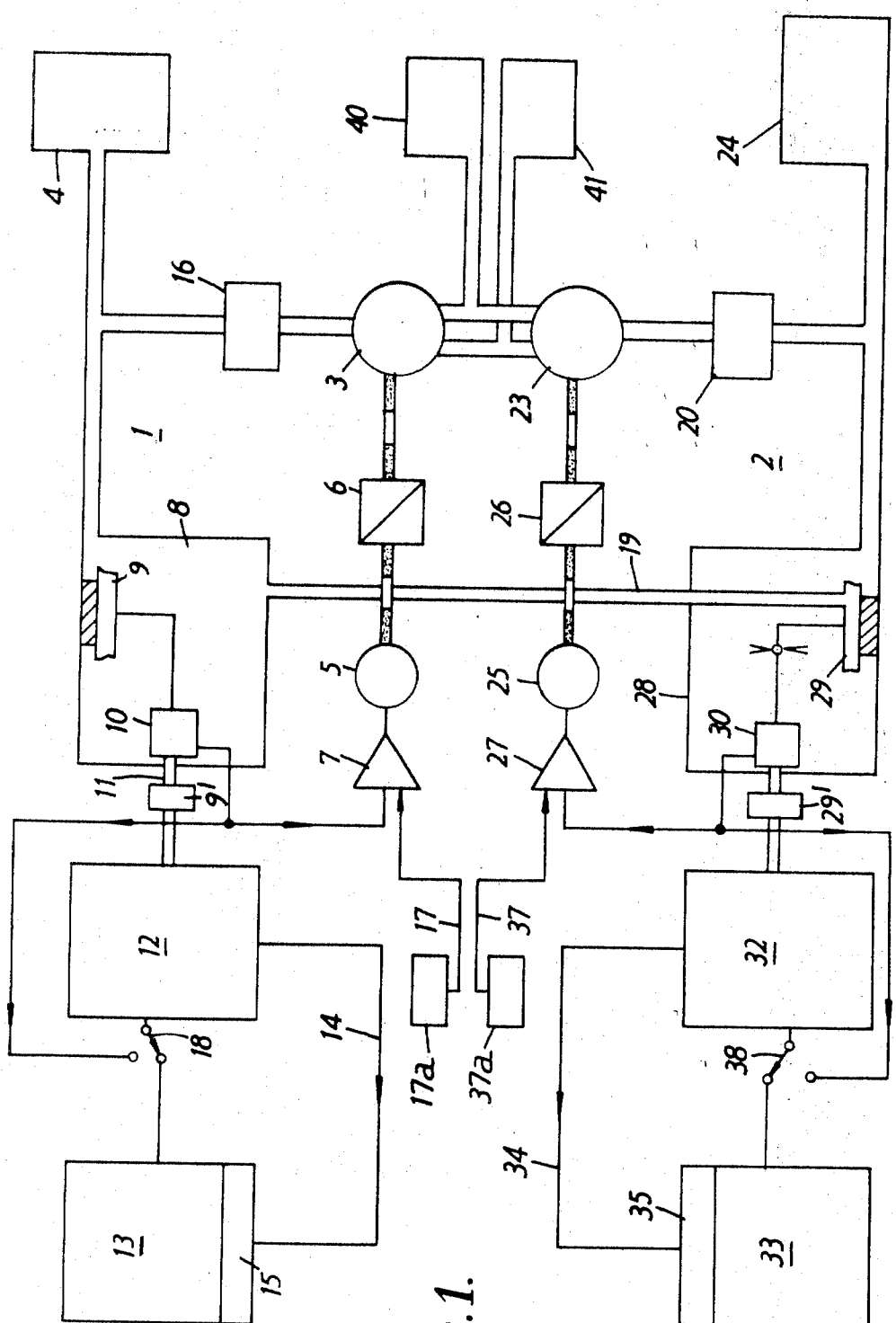

This patent application is a continuation-in-part of our co-pending application Ser. No. 365,652 filed May 7, 1964, now abandoned.

This invention relates to fluid pressure control systems and is applicable, for example to systems for providing one or more sources of fluid, such as air, of accurately controlled pressure.

According to the present invention, a fluid pressure control system comprises pressure selecting means for selecting a desired fluid pressure, a follow-up servo connected to receive as an input the output from the pressure selecting means, feedback means for the follow-up servo responsive to the output speed thereof to cause the servo to operate as a velodyne, a pressure responsive device responsive to the actual fluid pressure in accordance with a predetermined characteristic corresponding to a desired manner of pressure variation, a differential unit responsive to the output from the follow-up servo and the output from the pressure responsive device and adapted to produce a control signal in accordance with any difference therebetween, and a pressure regulating element operable in dependence upon the control signal so as to reduce this difference.

The differential unit may comprise a pick-off having a first member coupled to a capsule or like pressure responsive element and a second member coupled to the output of the follow up servo.

The system may be used to provide a source of fluid pressure which varies linearly or non-linearly in a predetermined manner, and this is achieved by operating the follow-up servo as a velodyne, that is to say, a constant velocity servo, in conjunction with a pick-off or like differential unit of the appropriate linear or non-linear characteristic. For example, the pressure responsive device may have a logarithmic characteristic whereby the pressure may be controlled to change logarithmically.

Preferably a switch is provided whereby the feedback means may be made ineffective to allow the follow-up servo to operate in a non-velodyne manner.

An important feature of the invention is that the system may be used to measure fluid pressure. This is achieved by rendering ineffective the pressure regulating element, and applying the control signal from the differential unit to the follow-up servo, the follow-up servo transmitting a signal to a readout unit by way of transmission link.

A further feature of the invention is that it may be used to control the difference between two fluid pressures, namely, a reference pressure and a pressure to be controlled. Thus, a fluid pressure control system in accordance with the invention may include means for selecting a desired fluid pressure differential, a second pressure responsive device responsive to the actual pressure differential between two fluid sources, a second differential unit responsive to the selected and the actual fluid pressure differentials and adapted to produce a second control signal in accordance with any difference therebetween, and a second pressure regulating element operable in dependence upon the second control signal to modify the pressure of one fluid source so as to reduce this difference.

With this arrangement preferably there is provided a second follow-up servo connected to receive as an input the output from the means for selecting a desired fluid pressure differential, second feedback means for the second follow-up servo responsive to the output speed thereof to cause it to operate as a velodyne, said second differential unit being responsive to the output from the second follow-up servo and the output from the second pressure responsive device.

Preferably a second switch is provided whereby the second feedback means may be made ineffective to allow the second follow-up servo to operate in a non-velodyne manner.

Figure 2:
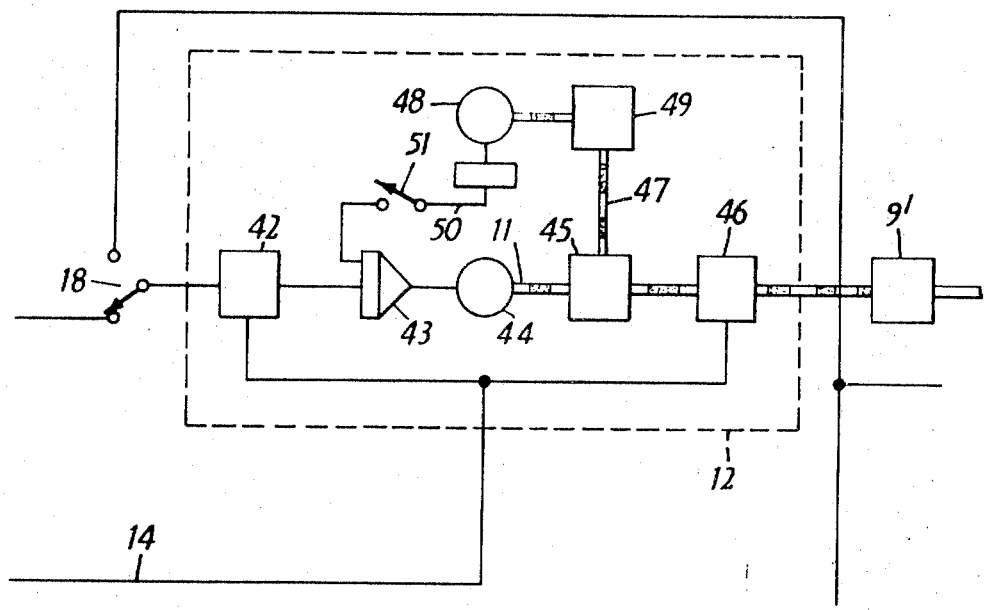

The invention will now be described by way of example with reference to the accompanying drawings of which:

FIG. 1 is a schematic diagram of one fluid pressure control system according to the invention including facilities for performing a variety of control and measuring functions; and FIG. 2 is a schematic diagram of detail of the follow-up servos of FIG. 1.

Referring to FIG. 1 the system comprises a first unit 1, which may be used to provide a fluid source of controlled absolute pressure, and a second unit 2, which may be used to provide a fluid source whose pressure is controlled with respect to a reference pressure. The unit 1 includes a valve 3 connected to sources of positive and negative pressures, 40, 41, for regulating the pressure of a fluid source 4, which valve is operated by an electric motor 5 through a gear box 6 or other drive element, the motor being controlled in dependence upon a signal from an amplifier 7. The fluid source is connected to a capsule unit 8 including a capsule or other pressure responsive device 9, and a differential unit 10, which takes the form of a pick-off having a first member which is set by the capsule 9 in accordance with the fluid pressure and a second member which is normally set by the output shaft 11 of a follow-up servo 12. Any difference between the settings of the first and second pick-off members results in a corresponding control signal being fed to the amplifier 7.

The follow-up servo 12 has a feedback arrangement to be described in detail with reference to FIG. 2 which renders it a constant velocity, or velodyne, servo. The servo is controlled by an input signal normally derived from a control unit 13, which is set initially by an operator or by external equipment, and a synchro transmission link 14 between the follow-up servo and a readout unit 15 on the control unit 13 enables the servo position to be checked. A pre-set angular correction element 9' is placed in the drive between the output shaft of the servo and the pick-off to eliminate the effect of non-linearity of the capsule unit.

The unit 2 is generally similar to the unit 1 and is used in a manner hereinafter described to control the fluid pressure at a source 24 with respect to the pressure at source 4. The unit 2 comprises a valve 23 for regulating the pressure at the source 24, which valve is operated by a motor 25 through gearing 26. The motor 25 is actuated in accordance with a signal from an amplifier 27. The pressure at the source 24 is compared with the pressure at source 4 by means of a differential capsule 29 situated in a capsule unit 28, and in accordance with the difference between these pressures one member of the pick-off 30 is set; the other member of the pick-off 30 is set by a follow-up servo 32 is dependence upon an input signal from a differential control unit 33. The follow-up servo 32 also has a feedback path for rendering it a velodyne servo and is connected by a further synchro transmission link 34 to a read-out unit 35 on the control unit 33.

In order to control the pressure at the fluid source 4, the control unit 13 is set in accordance with the desired pressure, and this demand is transmitted to the follow-up servo 12, the angle of which is transmitted back to the control unit via the synchro transmission link 14, and thus the servo position may be checked by the operator on the read-out unit 15. One member of the pick-off is thus moved at constant speed by the velodyne servo and is finally set by the servo to a position corresponding to the pressure demanded. If the pressure at the capsule 9, to which the other member is linked, is different from the pressure demanded, an error or control signal is fed to the amplifier 7, whereby the motor 5 is actuated to operate the valve 3 so as to change the pressure in the required direction. When the servo loop reaches a steady state the pressure at the source 4 is equal to the demanded pressure.

If the capsule unit 8 has a linear response, then the output will be a constant rate of change of pressure, but a small time lag will occur. Other types of response, for example logarithmic, may clearly be obtained by using a capsule unit with the appropriate characteristics. In a manner to be described the servos 12 and 32 may be switched at will to operate in a non-velodyne manner.

Small periodic or non-periodic displacements from a datum pressure may be obtained by feeding to the amplifier 7 a signal of appropriate waveform from a signal generator 17a, over the input 17, so that this signal and the signal from the pick-off are summed. The pressure is adjusted until the sum of these two signals is zero, and hence the alteration of the output pressure will be proportional to the signal generator output at any instant. If the rate of response demanded is too high, however, then the alteration in pressure will be reduced and will lag behind the signal generator output signal.

It is often necessary to check that apparatus connected to the fluid pressure source 4 does not have an excessive leakage to the atmosphere. By isolating the control valve 3 from the source 4 by means of a cock 16, the system pressure can be measured using the capsule unit and follow-up servo. The control signal from the pick-off 10 is switched into the follow-up servo by means of a switch 18, in place of the signal from the control unit 13, the amplifier 7 being rendered ineffective by closure of cock 16. The follow-up servo 12 operates to obtain a null signal from the pick-off, and its position is transmitted back to the readout unit 15 via the link 14, where it can be read directly as the system pressure. Leakage rates can be determined by noting changes of pressure, measured in this way, over a period of time.

In the operations described above the unit 2 plays no part and could be dispensed with. The unit 2 is necessary, however, if it is desired to control the pressure at the source 24 with respect to the pressure at the source 4, so as to maintain accurately a pressure differential between the two sources. This is achieved by means of the valve 23, which is operated in a manner similar to that of the valve 3 in unit 1, so as to reduce to zero an error or control signal fed from the pick-off 30 to the amplifier 27. The setting of one member of the pick-off 30 is determined by the differential capsule 29, however, which is connected to the capsule unit 8 by a connection 19 and is arranged to compare directly the pressures at the two sources. The other member of the pick-off 30 is set by means of the follow-up servo 32, the position of the output of which is adjusted at constant velocity according to a signal from the control unit 33, which is pre-set by the operator according to the required pressure differential. A pre-set angular correction element 29' is placed in the drive between the output shaft of the servo and the pick-off to eliminate the effect of non-linearity of the capsule unit. The output signal from the pick-off is a function of the difference between the settings of the two members.

The unit 2 can be operated in numerous ways similar to the various ways of operating the unit 1 described above, so as to maintain, as may be required, any pressure differential within a wide range, any required rate of change of pressure differential, or small periodic or non-periodic displacements from a datum differential, or the system may be used to measure the difference in pressure between the two sources.

A pressure differential between a reference pressure at the source 4 and the pressure at source 24 is obtained by setting the control unit 13 to produce the required reference pressure and setting the unit 33 to produce the required differential.

Small periodic or non-periodic displacements from a datum value of the pressure differential are produced by means of an appropriate signal from a signal generator 37a fed to the amplifier 27 over the input 37, the pressure differential being continuously adjusted so that the sum of this signal and the signal from the pick-off 30 is zero.

The pressure differential can be measured by isolating the valve 23 from the source 24 by means of a cock 20, thereby rendering the pressure differential control system ineffective, and switching the control signal from the pick-off 30 to the input of the follow-up servo 32 by means of the switch 38, so that the ultimate position of the servo, and hence the reading on the readout unit 35, is a direct measure of the pressure differential.

Clearly, if atmospheric pressure is applied to one side of the differential capsule 29, so that the reference pressure is atmospheric pressure, the output pressure of the source 24 will become a gauge pressure.

Referring now to FIG. 2 there is shown in detail the arrangement of the follow-up servo 12. It is to be understood that the follow-up servo 32 is exactly similar. The input to the servo is taken from switch 18 and applied as one input to a comparator and limiter 42, the clipped output of which is constant when there is a large position error and which output is applied as one input to a summing amplifier 43. This is necessary in order to obtain constant velocity between the start and finish positions of the follow-up servo. The output from the amplifier is applied to drive an electric motor 44. The output shaft 11 of the motor drives a right-angle drive unit 45 and a position sensor having a positional output as well as the correction element 9' described above. The output from sensor 46 is applied over link 14 to the readout unit 15 (FIG. 1) and also as the other input to comparator 42, the arrangement being such that motor 44 is driven in such a sense as to reduce the difference between the input signals to the comparator, thus constituting a follow-up servo.

A shaft 47 is driven through unit 45 by shaft 11 and drives a tacho-generator 48 through a change speed gear 49. The output from the tacho-generator is applied over a lead 50 through a normally closed switch 51 to another input of the summing amplifier 43. The velocity feedback to the amplifier from the tacho-generator modifies the input to the motor to cause it to operate at constant speed in response to an error signal from comparator 42. When the error signal has been reduced to zero by motor 44 having turned to the required position the motor stops.

Switch 51 is opened manually if the follow-up servo should be required to operate in a non-velodyne manner.

We claim:

1. A fluid pressure control system comprising pressure selecting means for selecting a desired fluid pressure and producing an output corresponding thereto, a follow-up servo connected to said pressure selecting means to receive as an input the output from the pressure selecting means and operate at a speed of operation and having a positional output, the follow-up servo having feedback means responsive to the speed of operation of said follow-up servo to cause the servo to operate as a velodyne, pressure responsive means including a pressure responsive device, said pressure responsive means being adapted to be coupled to a fluid source the pressure of which is to be controlled and the pressure responsive device being responsive to an actual fluid pressure in accordance with a predetermined characteristic corresponding to a desired manner of pressure variation and producing an output, a differential unit coupled to the follow-up servo and the pressure responsive device and receiving and responsive to the positional output from the follow-up servo and the output from the pressure responsive device for producing a control signal in accordance with any difference therebetween, and a pressure regulating means coupled to the differential unit for receiving the control signal therefrom and adapted to be coupled to the fluid source and operable in dependence upon the control signal to control the pressure of the fluid source so as to reduce this difference.

2. A system as claimed in claim 1 wherein said predetermined characteristic is such that the output of the pressure responsive device varies linearly with actual pressure.

3. A system as claimed in claim 1 wherein said predetermined characteristic is such that the output of the pressure responsive device varies logarithmically with actual pressure.

4. A system as claimed in claim 1 further including a switch in the feedback means of the follow-up servo whereby the feedback means may be made ineffective to allow the follow-up servo to operate in a non-velodyne manner.

5. A fluid pressure control system as claimed in claim 1, the system being adapted for measuring and indicating fluid pressure, wherein the system further includes means coupled to the pressure regulating means for rendering ineffective the pressure regulating means, circuit means coupled to said follow-up servo for applying the control signal to the follow-up servo in place of the output from the pressure selecting means, and a readout unit operable by the follow-up servo and coupled thereto.

6. A system as claimed in claim 1 wherein the pressure regulating means includes is a control valve, an electric motor, drive means coupling the motor with the control valve, and means for energising the motor comprising a servo amplifier having an input to which said control signal may be applied.

7. A system as claimed in claim 6, wherein the amplifier has a second input, and wherein means are coupled to said second input for applying to said second input a predetermined time-dependent signal for modifying the energisation of the motor, and hence the operation of the control valve, so as to control the fluid pressure in accordance with the time-dependent signal.

8. A system for controlling the difference between the pressure of two fluid sources, said system comprising a reference pressure selecting means for selecting a reference pressure for the first fluid source and producing an output corresponding thereto, a follow-up servo connected to said reference pressure selecting means to receive as an input the output from the reference pressure selecting means and operate at a speed of operation and having a positional output, the said follow-up servo having a feedback means responsive to the speed of operation of said follow-up servo to cause the servo to operate as a velodyne, a first pressure responsive means including a first pressure responsive device, said first pressure responsive means being adapted to be coupled to the first fluid source the pressure of which is to be controlled at a reference pressure and the first pressure responsive device being responsive to an actual fluid pressure in accordance with a predetermined characteristic corresponding to a desired manner of pressure variation of said first fluid source, said first pressure responsive device producing an output, a first differential unit coupled to the follow-up servo and the first pressure responsive device and receiving and responsive to the positional output from the follow-up servo and the output from the first pressure responsive device for producing a first control signal in accordance with any difference therebetween, a first pressure regulating means coupled to the differential unit for receiving the first control signal therefrom and adapted to be coupled to the first fluid source and operable in dependence on the first control signal to control the pressure of the first fluid source to reduce the difference to which said first differential unit responds, a differential pressure selecting means for selecting a desired fluid pressure differential and producing an output corresponding thereto, a second pressure responsive means including a second pressure responsive device, said second pressure responsive means being adapted to be connected to said second fluid source and to said first pressure responsive means and said second pressure responsive device being responsive to the pressure differential between said second fluid source and said first fluid source and producing an output in accordance with any difference therebetween, a second differential unit coupled to said differential pressure selecting means and to said second pressure responsive device and receiving and responsive to the output from the differential pressure selecting means and the output from the second pressure responsive device and producing a second control signal in accordance with any difference therebetween, and a second pressure regulating mean coupled to said second differential unit for receiving the second control signal therefrom and adapted to be coupled to the second fluid source and operable in dependence on the second control signal to control the pressure of the second fluid source to reduce the difference to which said second differential unit responds.

9. A system as claimed in claim 8 further comprising a further follow-up servo connected to receive as an input the output from the differential pressure selecting means, said further follow-up servo having a speed of operation and a positional output and having feedback means responsive to the speed of operation to cause it to operate as a velodyne, said second differential unit being connected to the further follow-up servo to receive as an input the positional output of said further servo.

10. A system as claimed in claim 9, and adapted for measuring and indicating the pressure differential between two fluid sources, the system further including means coupled to the second pressure regulating means for rendering ineffective the second pressure regulating means, circuit means coupled to the second follow-up servo for applying said further control signal to the further follow-up servo in place of the output from the means for selecting a desired fluid pressure differential, and a second readout unit coupled to said further follow-up servo and operable thereby.

11. A system as claimed in claim 9 wherein a second switch is connected in said feedback means to allow the further follow-up servo to operate in a non-velodyne manner.

References Cited

UNITED STATES PATENTS

| | | | |
|---|---|---|---|
| 2,883,996 | 4/1959 | Blewett et al. | 137—100 |
| 2,948,295 | 8/1960 | Smith | 137—487.5 |
| 2,992,302 | 7/1961 | Schuler | 137—102 X |
| 3,048,185 | 8/1962 | Howard | 137—103 |
| 3,237,107 | 2/1966 | Bresenoff et al. | 73—398 X |
| 3,247,712 | 4/1966 | Johnson et al. | 73—152 |
| 3,390,694 | 7/1968 | Rouvalis | 137—85 |

CLARENCE R. GORDON, Primary Examiner

D. J. ZOBKIW, Assistant Examiner

U.S. Cl. X.R.

73—398; 137—87, 103, 487.5